United States Patent Office 3,036,110
Patented May 22, 1962

3,036,110
PROCESS FOR THE PRODUCTION OF MONO-
MERIC NEUTRAL ALIPHATIC ESTERS OF
PHOSPHORUS HAVING A COORDINATION
NUMBER OF 3
Reinhard Schliebs, Koln-Stammheim, Germany, assignor to Farbenfabriken Bayer Aktiengesellschaft, Leverkusen, Germany, a corporation of Germany
No Drawing. Filed July 22, 1959, Ser. No. 828,702
Claims priority, application Germany Aug. 5, 1958
7 Claims. (Cl. 260—461)

This invention relates to a process for the production of esters of phosphorus and is more particularly concerned with a novel process for the production of monomeric neutral aliphatic esters of phosphorus having a coordination number of 3.

It is known that esters of the general formula $$R_xP(OR')_{(3-x)}$$

in which $x$ is 0, 1 or 2, R represents an aliphatic, araliphatic or aromatic radical and R' represents an aliphatic radical, can be prepared by reacting a phosphorus halide of the formula $$R_xPHal_{(3-x)}$$

in which Hal represents a halogen atom and R and $x$ have the previously specified meanings, with an alcohol in the presence of an acid binding agent, such as a tertiary aliphatic amine or aniline.

The acid-binding agent neutralizes the hydrogen halide which is formed during the reaction, thereby obviating the splitting off of alkyl halide which would otherwise occur. In the aforementioned process intensive cooling is necessary and this is disadvantageous from an economical point of view. There is also the difficulty of separating the amine hydrochloride which is formed as a by-product from the main reaction product. Separation by filtration involves considerable loss, since the main reaction product cannot be completely removed from the filter cake. Losses also occur if the main reaction product is separated from the amine hydrochloride by distillation since amine hydrochlorides split off alkyl halides from the esters at high temperatures.

It has also been proposed to use ammonia as the acid binding agent in the aforementioned process. In this case, however, care has to be taken to ensure that the reaction mixture at any given time does not contain more ammonia than corresponds to the amount of hydrogen halide liberated since otherwise the residual phosphorus halide bonds will react with the excess ammonia to form by-products which cannot be converted into the desired neutral esters. Consequently when ammonia is employed as the acid binding agent it is necessary either to work in two stages and to employ temperatures of below —20° C., or to work in a completely continuous manner, also at very low temperatures. In the latter case exceptionally high standards of accuracy must be maintained in measuring the quantity of ammonia which is added to the reaction mixture.

It is an object for the present invention to provide a novel process for the production of esters of phosphorus. Another object of the present invention is to provide a process for the production of monomeric neutral aliphatic esters of phosphorus having a coordination number of 3. A further object is to provide a process for said esters of phosphorus which can be carried out in simple manner and leads to high yields. A still further object is to provide a process for the production of those esters which are very susceptible to hydrolysis. Further advantages and objects of the present invention will become apparent as the description proceeds.

It has now been found that monomeric neutral aliphatic esters of phosphorus having a coordination number of 3 and of the general formula $$R_xP(OR')_{(3-x)}$$

wherein $x$ is 0, 1 or 2, R represents an aliphatic, araliphatic or aromatic radical and R' represents an aliphatic radical, can be obtained in a simple manner by reacting a phosphorus halide of the general formula $$R_xPHal_{(3-x)}$$

in which Hal represents a halogen atom and R and $x$ have the previously specified meanings with at least an equivalent amount of an aliphatic alcohol, in the presence of at least an equivalent amount of a secondary aliphatic amine, the amounts of alcohol and amine both being based on the halogen content of the phosphorus halide.

The essence of the present invention lies in the fact that the products formed by the reaction of the phosphorus halides with the secondary aliphatic amines can be readily reacted with alcohols to form neutral esters of the aforementioned general formula. It is thus possible in the process according to the present invention to employ an excess of secondary amine, based on the hydrogen halide which is liberated during the reaction, thereby obviating the necessity for very accurate measurement of the quantity of amine which is added to the reaction mixture. However, even if an exactly equivalent amount of aliphatic secondary amine, based on the halogen content of the phosphorus halide, is employed in the process of the present invention the present process is still superior to the known process using ammonia. For example high yields of trimethyl phosphite can be obtained by employing an exactly equivalent amount of amine in the present process and in this connection it should be noted that trimethyl phosphite cannot be obtained by the prior process employing ammonia as the acid binding agent. The process according to the present invention can be carried out at elevated temperatures so that no equipment for cooling the reaction mixture is necessary.

The process of the present invention can be carried out in several ways.

For example, the alcohol and the amine may be initially introduced into the reaction vessel and the phosphorus halide introduced subsequently. Alternatively the amine and the phosphorus halide may be simultaneously added to the alcohol. In order to facilitate measurement of the quantities of the reaction components it is desirable to ensure that always rather more amine is supplied than is necessary to combine with the hydrogen halide which is liberated during the reaction. The process can also be carried out in a fully continuous manner by supplying all three components simultaneously in previously prepared final product, reaction mixture or an inert diluent.

In another embodiment of the present process the alcohol is introduced into a mixture of the phosphorus halide and amine in an inert diluent. The amine halide formed in these reactions is preferably extracted with water.

The following embodiment of the process according to the present invention is particularly preferred:

The phosphorus halide is first of all caused to react with the secondary amine, whereby the corresponding phosphorus amide is formed. This amide is isolated and then reacted with the alcohol to form the corresponding ester. The amine which is liberated is preferably removed from the reaction mixture by distillation. Consequently, the amine which is liberated should preferably have a lower boiling point than the alcohol to be esterified. This condition is always satisfied if dimethylamine is employed as the secondary amine.

An advantage of this embodiment of the process lies in the fact that it is possible thereby to prepare esters, such as trimethyl phosphite, which are very susceptible to hydrolysis. The amine halide which is formed in the first stage of the reaction is extracted with water before carrying out the second stage of the reaction so that the phosphorus ester which is formed only in the second stage of the reaction does not come into contact with water. An additional advantage of this particular embodiment is that complete esterification occurs in each case and thus acid esters are not formed in the process. The formation of acid esters may give rise to difficulties if they have approximately the same boiling point as that of the main reaction product.

When carrying out reactions in which a dialkyl ammonium halide is formed by reaction of the secondary amine with the liberated hydrogen halide, it is advisable in many cases to employ a diluent, since the quantitative ratio between solid substances and liquid in a reaction mixture of stoichiometric composition makes the reaction mixture difficult to handle. The alcohols to be esterified are preferably employed as diluents by adding them to the reaction mixture in excess. If alcohols of low molecular weight such as methanol and ethanol, are employed as diluents all the dialkyl ammonium chloride can be kept in solution, thereby facilitating fully continuous operation. However, there may be employed as a diluent in the process according to the present invention any liquid which is inert to the reactants and products under the reaction conditions.

It is not necessary to employ a low reaction temperature in any of the embodiments of the present invention. It is therefore possible to dispense with external cooling and the heat of reaction, which is considerable in some cases, can be dissipated by operating under reflux. The capacity of the apparatus is then only limited by the capacity of the reflux condenser. Reaction temperatures of from room temperature to approximately 200° C. may be produced depending on the nature of the reactants and diluent employed in the process.

In the working up of the reaction mixture the amine halide which is formed is extracted with water and the organic phase is thereafter subjected to distillation. When producing esters which are susceptible to hydrolysis, such as trimethyl phosphite, it is preferable to add a neutral diluent, such as methylene chloride, to the reaction mixture in order substantially to prevent hydrolysis of the ester during the extraction of the amine halide with water.

In the two-stage form of the process, the working up of the final reaction mixture can be effected by distilling off the excess alcohol, if an excess of alcohol is present. In this case, the pure reaction product is obtained directly.

Suitable phosphorus halides for employment in the process according to the present invention are the phosphorus trihalides, especially phosphorus trichloride and phosphorus tribromide and those phosphorus trihalides in which one or two halogen atoms have been replaced by an aliphatic, araliphatic or aromatic radical. Especially suitable are phosphorus trichloride, methyl phosphorus dichloride, diethyl phosphorus chloride, ethyl phosphorus dichloride, dimethyl phosphorus chloride, methylethyl phosphorus chloride, phenyl phosphorus dichloride, diphenyl phosphorus chloride, butyl phosphorus dichloride, ethylphenyl phosphorus chloride and the corresponding bromine compounds.

Alcohols suitable for employment in the process according to the present invention are straight or branched chain aliphatic alcohols, such as methanol, ethanol, propanol, secondary butanol, tertiary butanol and 2-ethylhexanol; cycloaliphatic alcohols, such as cyclohexanol and cyclohexyl propanol; and aliphatic alcohols containing an aromatic nucleus, such as benzyl alcohol.

Any secondary aliphatic amine may be employed as acid-binding agent in the process according to the present invention. However, secondary amines with short aliphatic chains are preferred because of their low boiling points and the ease with which they can be prepared. Examples of particularly preferred amines are dimethylamine, diethylamine, methylethylamine, diisobutylamine and diisopropylamine.

The esters obtained by the process according to the present invention may be used as additives for plastics, as disulphurizing agents and particularly as intermediates in the manufacture of plant-protecting agents.

The present invention is further disclosed in the following examples which are illustrative but not limitative thereof.

Example 1

1.0 mol of phosphorus acid tri-(dimethyl)-amide is slowly mixed at a temperature of approximately 90° C. with 3.0 mols of methanol. The mixture is kept at boiling point until evolution of dimethylamine ceases. The residue consists of practically pure trimethyl phosphite (B.P. 45° C./60 mm. Hg). The yields of trimethyl phosphite and recovered dimethylamine are quantitative.

The phosphorus acid tri-(dialkyl)-amides used as starting material in Examples 1, 3 and 5 are produced in known manner by reacting phosphorus trichloride with the corresponding secondary amine in the presence of an inert solvent. The reaction components are supplied in such a way that the solvent boils under reflux. When the reaction is complete, the dialkyl ammonium chloride which is formed is removed by extraction with water, the resulting organic phase is dried and the reaction product is recovered, for example by distillation. The secondary amine may be recovered from the aqueous salt solution in known manner.

Example 2

3.5 mols of methanol and 300 ml. of methylene chloride are placed in a reaction vessel provided with a stirrer and a reflux condenser and methyl orange is added as indicator. The temperature of the liquid in the reflux condenser must not exceed 0° C. After adding 0.3 mol of dimethylamine, another 3 mols of amine and 1 mol of phosphorus trichloride are simultaneously introduced into the reaction vessel in such a way that the reaction mixture always remains alkaline. The reaction mixture thereby comes to boiling point. The rate of addition of the amine and phosphorus trichloride depends only on the capacity of the condenser. After the reaction is complete, extraction is effected twice with water and the organic phase is worked up by distillation. Yield of trimethyl phosphite: 75–80% of the theoretical, B.P. 45° C./60 mm. Hg.

Example 3

1.0 mol of phosphorus acid tri-(dimethyl)-amide and 3.0 mols of ethanol are reacted in the manner described in Example 1. The yields of triethyl phosphite (B.P. 63° C./23 mm. Hg) and recovered dimethylamine are quantitative.

Example 4

6 mols of ethanol are placed in the reaction vessel described in Example 2. 3.3 mols of dimethylamine are then added and thereafter 1 mol of phosphorus trichloride is added dropwise. The reaction mixture boils under reflux. The reaction mixture is worked up as indicated in Example 2. Yield of triethyl phosphite: 85–90% of the theoretical, B.P. 45° C./11 mm. Hg.

Example 5

1.0 mol of phosphorus tri-(dimethyl)-amide and 3.0 mols of 2-ethyl hexanol are reacted in the manner described in Example 1. The yields of tri-(2-ethylhexyl)-phosphite (B.P. 153° C./1 mm. Hg) and recovered dimethylamine are quantitative.

Example 6

88 g. of methyl phosphine tetramethyl diamine of the formula

are mixed with 42 g. of methanol, the temperature of the reaction mixture rising during the mixing to between 70 and 90° C. 59 g. of dimethylamine and 70 g. of methyl dimethoxy phosphine ($CH_3P(OCH_3)_2$) having a B.P. of 61° C./295 mm. Hg are formed in practically quantitative yields.

The methyl phosphine tetramethyl diamine employed in this example is produced as follows:

Methyl phosphine dichloride is reacted with dimethylamine in a solvent. After the reaction is complete, the dimethylamine hydrochloride which is formed is dissolved in water and the aqueous and organic phases separated. Methyl phosphine tetramethyl diamine (B.P. 77° C./86 mm. Hg) is recovered in pure form from the organic phase.

*Example 7*

Ethyl phosphorus dichloride is reacted with dimethylamine as described in Example 6 to form ethyl phosphine tetramethyl diamine (B.P. 45° C./14 mm. Hg). The ethyl phosphine tetramethyl diamine thus obtained can be reacted with ethanol to form ethyl diethoxy-phosphine (B.P. 71° C./55 mm. Hg) in practically quantitative yield.

*Example 8*

Phenyl phosphorus dichloride is reacted with dimethylamine as described in Example 6 to give phenyl phosphine tetramethyl diamine (B.P. 124° C./12 mm. Hg). The phenyl phosphine tetramethyl diamine thus obtained can be reacted with ethanol to give phenyl diethoxy phosphine (B.P. 109° C./12 mm. Hg) in practically quantitative yield.

*Example 9*

5 mols of methanol are placed in the reaction vessel described in Example 2 and 1.1 mols of dimethylamine are dissolved therein. 1 mol of diphenyl phosphorus monochloride is then added, the reaction mixture boiling under reflux. Working up of the reaction mixture is carried out as described in Example 2. The yield of diphenyl monomethoxy phosphine (B.P. 158° C./12 mm. Hg) is 80% of the theoretical.

What I claim is:

1. A process for the production of monomeric neutral esters of phosphorus having a coordination number of 3 and having the general formula

$$R_xP(OR')_{3-x}$$

wherein R represents a member selected from the group consisting of alkyl and aryl radicals, R' represents a member selected from the group consisting of alkyl, cycloalkyl and aralkyl radicals and $x$ is a member selected from the group consisting of 0, 1 and 2, which comprises reacting a phosphorus halide having the general formula

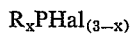
$$R_xPHal_{(3-x)}$$

in which Hal represents a halogen atom and R and $x$ are as defined above, wtih at least an equivalent amount of a dialkylamine, said amount being calculated with respect to the halogen content of the phosphorus halide, isolating the phosphorus amide thereby formed, reacting said phosphorus amide thereby formed, reacting said phosphorus amide with an equivalent amount of an alcohol which is a member selected from the group consisting of alkyl, cycloalkyl and aralkyl alcohols, said amount of alcohol being calculated with respect to the amine content of said phosphorus amide, said alcohol being selected so that the secondary amine liberated by the reaction has a lower boiling point than said alcohol, effecting said reaction at a temperature above the boiling point of said liberated secondary amine and recovering the monomeric neutral aliphatic ester of phosphorus formed.

2. A process for the production of trimethyl phosphite, which comprises reacting phosphorus trichloride with at least an equivalent amount of dimethylamine, said amount being calculated with respect to the chlorine content of the phosphorus chloride, isolating the phosphorus acid tri-(dimethyl)-amide thereby formed, reacting said phosphorus acid tri-(dimethyl)-amide with the equivalent amount of methanol, said amount of methanol being calculated with respect to the amine content of said phosphorus acid tri-(dimethyl)-amide, at a temperature of about 90° C., and recovering the trimethyl phosphite thereby formed.

3. A process for the production of triethyl phosphite, which comprises reacting phosphorus trichloride with at least an equivalent amount of dimethylamine, said amount being calculated with respect to the chlorine content of the phosphorus chloride, isolating the phosphorus acid tri-(dimethyl)-amide thereby formed, reacting said phosphorus acid tri-(dimethyl)-amide with the equivalent amount of ethanol, said amount of ethanol being calculated with respect to the amine content of said phosphorus acid tri-(dimethyl)-amide, at a temperature of about 90° C., and recovering the triethyl phosphite thereby formed.

4. A process for the production of tri-(2-ethylhexyl)-phosphite, which comprises reacting phosphorus trichloride with at least an equivalent amount of dimethylamine, said amount being calculated with respect to the chlorine content of the phosphorus chloride, isolating the phosphorus acid tri-(dimethyl)-amide thereby formed, reacting said phosphorus acid tri-(dimethyl)-amide with the equivalent amount of 2-ethyl hexanol, said amount of 2-ethyl hexanol being calculated with respect to the amine content of said phosphorus acid tri-(dimethyl)-amide, at a temperature of about 90° C., and recovering the tri-(2-ethylhexyl) phosphite thereby formed.

5. A process for the production of methyl dimethoxyphosphine, which comprises reacting methyl phosphine dichloride with dimethylamine, separating the methyl phosphine tetramethyl diamine from the dimethylamine hydrochloride thereby formed, introducing for reaction into said separated methyl phosphine tetramethyl diamine at a temperature higher than the boiling point of said diamine at least an equivalent amount of methanol, said amount of methanol being calculated with respect to the amine content of said methyl phosphine tetramethyl diamine, and recovering said methyl dimethoxy phosphine thereby formed.

6. A process for the production of ethyl diethoxy phosphine, which comprises reacting ethyl phosphorus dichloride with dimethylamine, separating the ethyl phosphine tetramethyl diamine from the dimethylamine hydrochloride thereby formed, introducing for reaction into said separated ethyl phosphine tetramethyl diamine at a temperature higher than the boiling point of said diamine at least an equivalent amount of ethanol, said mount of ethanol being calculated with respect to the amine content of said ethyl phosphine tetramethyl diamine, and recovering said ethyl diethoxy phosphine thereby formed.

7. A process for the production of phenyl diethoxy phosphine, which comprises reacting phenyl phosphorus dichloride with dimethylamine, separating the phenyl phosphine tetramethyl diamine from the dimethylamine hydrochloride thereby formed, introducing for reaction into said separated phenyl phosphine tetramethyl diamine at a temperature higher than the boiling point of said diamine at least an equivalent amount of ethanol, said amount of ethanol being calculated with respect to the amine content of said phenyl phosphine tetramethyl diamine, and recovering said phenyl diethoxy phosphine thereby formed.

References Cited in the file of this patent

FOREIGN PATENTS

| | | |
|---|---|---|
| 749,550 | Great Britain | May 30, 1956 |
| 1,028,554 | Germany | Apr. 24, 1958 |

UNITED STATES PATENT OFFICE
CERTIFICATE OF CORRECTION

Patent No. 3,036,110                               May 22, 1962

Reinhard Schliebs

It is hereby certified that error appears in the above numbered patent requiring correction and that the said Letters Patent should read as corrected below.

Column 4, line 5, for "disulphurizing" read -- desulphurizing --; column 5, line 58, for "wtih" read -- with --; lines 62 and 63, strike out "thereby formed, reacting said phosphorus amide"; column 6, line 53, for "mount" read -- amount --.

Signed and sealed this 18th day of September 1962.

(SEAL)
Attest:

ERNEST W. SWIDER
Attesting Officer

DAVID L. LADD
Commissioner of Patents